United States Patent
Liu et al.

(10) Patent No.: US 7,068,332 B2
(45) Date of Patent: Jun. 27, 2006

(54) DIRECT-TYPE BACKLIGHT UNIT WITH DIFFUSION FILM FOR FLAT PANEL LIQUID CRYSTAL DISPLAY

(75) Inventors: Han-Chou Liu, Hsin-Chu (TW); Chuan-Pei Yu, I-Lan Hsien (TW); Chin-Kun Hsieh, Hsin-Chu (TW)

(73) Assignee: AU Optronics Corp., Hsin-Chu (TW)

( * ) Notice: Subject to any disclaimer, the term of this patent is extended or adjusted under 35 U.S.C. 154(b) by 20 days.

(21) Appl. No.: 10/604,717

(22) Filed: Aug. 13, 2003

(65) Prior Publication Data

US 2005/0275766 A1    Dec. 15, 2005

(30) Foreign Application Priority Data

Aug. 16, 2002 (TW) .............................. 91118591 A (51) Int. Cl.
*G02F 1/1335* (2006.01)

(52) U.S. Cl. .......................................... 349/64; 349/161
(58) Field of Classification Search ................ 349/64, 349/65, 112, 61
See application file for complete search history.

(56) References Cited

U.S. PATENT DOCUMENTS

| 5,983,543 | A  | * | 11/1999 | Hillstrom ..................... 40/574 |
| 6,447,121 | B1 | * | 9/2002  | Woo ............................ 353/52 |
| 6,515,785 | B1 | * | 2/2003  | Cobb et al. .................. 359/247 |
| 2002/0154474 | A1 | * | 10/2002 | Merz et al. .................. 361/683 |
| 2003/0086255 | A1 | * | 5/2003  | Moon et al. ................... 362/97 |

* cited by examiner

*Primary Examiner*—Andrew Schechter
*Assistant Examiner*—Richard H Kim
(74) *Attorney, Agent, or Firm*—Winston Hsu (57) ABSTRACT

A direct-type backlight unit for flat panel liquid crystal display is provided. The direct-type backlight unit includes a plurality of lamps installed within a housing. A reflection plate is installed under the plurality of lamps in the housing. A diffusion film with a plurality of apertures thereon is installed above the plurality of lamps for diffusing light generated by the plurality of lamps. An optic focusing film is located on the diffusion film. The flat panel liquid crystal display is located above the optic focusing film.

20 Claims, 8 Drawing Sheets

DIRECT-TYPE BACKLIGHT UNIT WITH DIFFUSION FILM FOR FLAT PANEL LIQUID CRYSTAL DISPLAY

BACKGROUND OF INVENTION

1. Field of the Invention

The present invention relates to a backlight unit for flat panel displays, and more particularly, a direct-type backlight unit having improved heat-dissipating ability for flat panel displays.

2. Description of the Prior Art

Backlight units are known in the art. The backlight unit, which is a key element in the fabrication of liquid crystal displays, is widely used in digital cameras, PDAs, vehicle satellite navigation systems, computer monitors, flat panel TVs and so on. Typically, a backlight unit, which is generally installed underneath a display panel, comprises a light source (or multiple light sources) and a light diffusion means for providing users and consumers with diffused, ample, and comfortable backlighting. Light penetrates the overlying display panel and forms various images controlled by pixel electrodes densely arranged on the display panel. Backlight units are typically divided into two major categories: edge light type and direct-type, where the direct-type backlight unit can provide higher intensity of light and is thus more suited for large size display panels such as TV panels than the edge light type.

Figure 1:
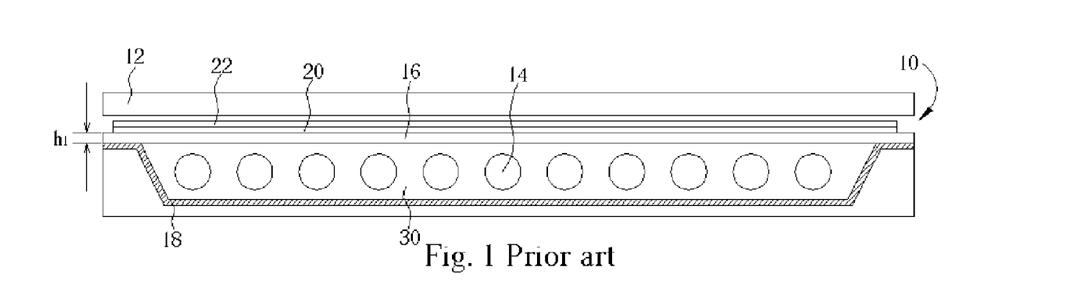
FIG. 1 is a cross-sectional view of a conventional direct-type backlight unit.

Referring to FIG. 1, a cross-sectional view of a conventional direct-type backlight unit is illustrated. The backlight unit 10 is installed underneath a display panel 12 and comprises a diffusion plate 16, a reflection plate 18, and multiple light tubes 14 arranged in parallel in a chamber 30 defined by the diffusion plate 16 and the reflection plate 18. The reflection plate 18 is used to reflect light generated by the light tubes 14 upward to the overlying diffusion plate 16 thereby increasing light use efficiency of the backlight unit. The diffusion plate 16 is used to diffuse light (or reflected light) by means of shielding, scattering, or refraction. The diffusion plate 16 is typically made of acrylic or polycarbonate (PC) materials having a thickness $h_1$ of about 2 mm to 3 mm and a light transmission ratio of about 50% to 80%. According to a prior art method to generate diffused light, dispersed ink or light shielding tiny dots are printed onto a surface of the diffusion plate 16.

Still referring to FIG. 1, above the diffusion plate 16, a diffusing sheet 20 and an optic focusing film 22 are typically provided for enhancing backlighting. The diffusing sheet 20 (also referred to as a protection diffusing sheet) is made of PET or PC and has a higher light transmission ratio than that of the underlying diffusion plate 16, a lower haze, and a thickness of about 0.11 mm to 0.15 mm. It is known in the art that the number of the diffusing sheet 20 and the number of the optic focusing film 22 and arranging sequence of the two can be adjusted according to desired purposes.

However, the prior art direct-type backlight unit has a drawback that it has poor light use efficiency since light generated by the light sources is partially shielded by the ink dots printed at the lower surface of the diffusion plate 16. Besides, heat radiation is also a serious problem for prior art direct-type backlight units. In a practical case, heat accumulated in the chamber 30 reduces lifetime of the light tubes 14 and the high temperature on the diffusion plate 16 causes distortion of the optic focusing film 22, that, in turn, leads to poor light output performance. An approach to solving this heat buildup problem is using a heat-radiating fan installed at a periphery of the backlight module. Nevertheless, this introduces undesirable dust into the backlight unit casing and also consumes electricity. Consequently, there is a strong need to provide an improved direct-type backlight unit to elongate lifetime of light tubes, and, at the same time, thin down the backlight unit.

SUMMARY OF INVENTION

Accordingly, the primary objective of the claimed invention is to provide an improved direct-type backlight unit to solve the above-mentioned problems.

According to the claimed invention, a direct-type backlight unit for flat panel liquid crystal display is provided. The direct-type backlight unit includes a plurality of lamps installed within a housing. A reflection plate is installed under the plurality of lamps in the housing. A diffusion film with a plurality of apertures thereon is installed above the plurality of lamps for diffusing light generated by the plurality of lamps. An optic focusing film is located on the diffusion film. The flat panel liquid crystal display is located above the optic focusing film.

Other objects, advantages, and novel features of the claimed invention will become more clearly and readily apparent from the following detailed description when taken in conjunction with the accompanying drawings.

DETAILED DESCRIPTION

Figure 2:
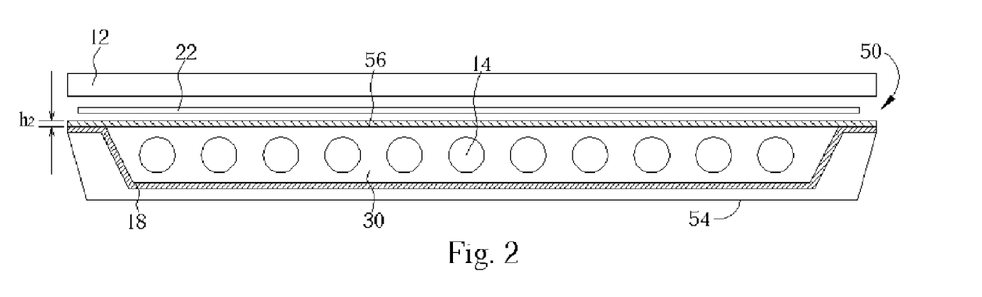
FIG. 2 is a cross-sectional, schematic diagram illustrating a direct-type backlight unit according to the present invention.

Please refer to FIG. 2. FIG. 2 is a cross-sectional schematic diagram illustrating a direct-type backlight unit 50 according to a first preferred embodiment of this invention. As shown in FIG. 2, the backlight unit 50 is located underneath a display panel 12. The backlight unit 50 comprises a diffusion film 56, a reflection plate 18, and a plurality of lamps 14. The lamps 14 may be cold cathode fluorescent lamps (CCFL) arranged in a chamber 30 defined by the diffusion film 56 and the reflection plate 18. The reflection plate 18 has a horizontal bottom surface and an inclined side surface and may be made of metals such as aluminum, alloys, foamed PET film, or PC resins. The diffusion film 56, reflection plate 18, and the lamps 14 are fixed on a housing 54 to ensure that dust is kept outside from entering the backlight unit 50. The diffusion film 56 is made of materials having high thermal conductivity, for example, metals or alloys such as aluminum, copper, magnesium, titanium, or silver, or polymer composite materials.

According to the first preferred embodiment of this invention, the diffusion film 56 is made of aluminum having a thickness $h_2$ of less than 0.5 mm. The diffusion film 56 has a plurality of tiny apertures (not shown in FIG. 2) formed thereon. The density of these densely arranged tiny apertures and the dimensions of each of these tiny apertures depend on the arrangement of the lamps 14. An optic film 22 may be installed over the diffusion film 56 having a gap of preferably about 1 mm therebetween. The existence of the gap between the diffusion film 56 and the overlying optic film 22 prevents the heat transferred to the diffusion film 56 from distorting the optic film 22.

Figure 3:
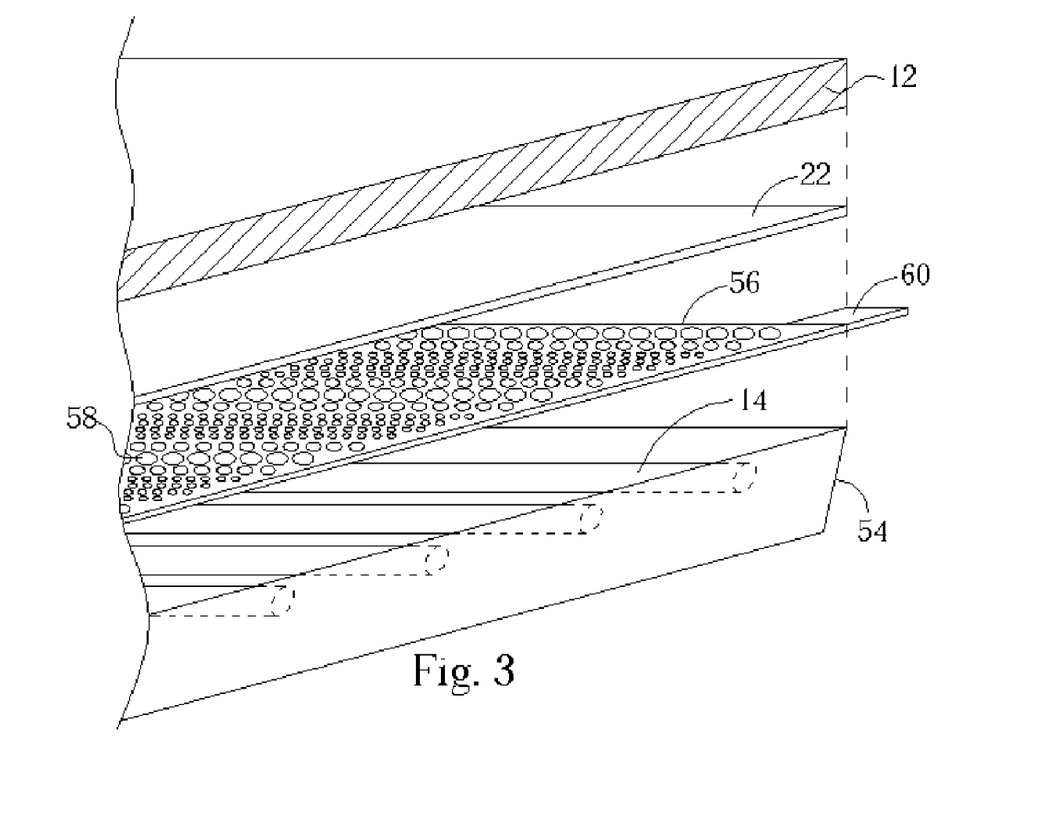
FIG. 3 is a perspective diagram schematically showing the exploded backlight unit of FIG. 2.
Figure 4:
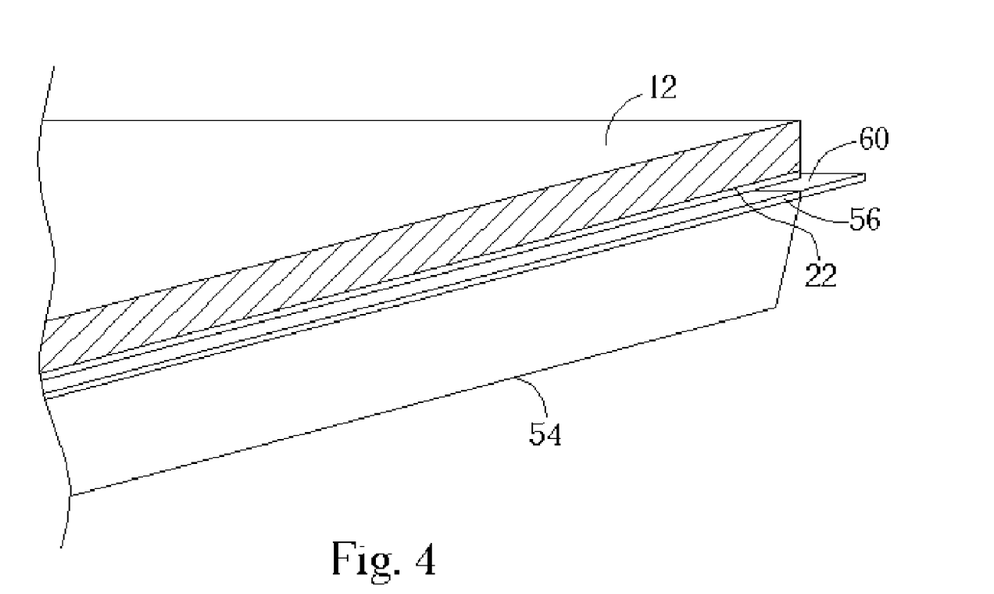
FIG. 4 is a typical view of the backlight unit of FIG. 3 after assembling.

Please refer to FIG. 3 and FIG. 4, where FIG. 3 is a perspective diagram schematically showing an exploded backlight unit according to the first preferred embodiment of this invention, and FIG. 4 is a typical view of the backlight unit of FIG. 3 after assembly.

As mentioned, the diffusion film 56 is made of materials with high thermal conductivity such as aluminum, copper, magnesium, titanium, or silver, or polymer composite materials, preferably metals. According to the first preferred embodiment of this invention, the diffusion film 56 is made of aluminum having a thickness $h_2$ of less than 0.5 mm. The diffusion film 56 may be fixed on the housing 54 by using screws (not shown) or the like. As specifically indicated in FIG. 3, A plurality of tiny apertures 58 are formed on the diffusion film 56, and the packing density and the dimensions of these apertures 58 depend upon the arrangement of the underlying lamps 14.

More specifically, according to the preferred embodiment of this invention, to achieve a best light diffusion performance, the dimension of an aperture right above one of the lamps 14 has a smallest value. The dimension of a next aperture that is distant from the lamp 14 becomes larger. It is understood that the size of apertures 58 in FIG. 3 and following figures are only for purpose of explanation and are not drawn to scale. In a practical case according to this invention, the diameter of the apertures may be in a range from few micrometers to 1 micrometer. The formation of the apertures 58 is accomplished by using a laser technique or micro-etching processes to form a desired shape of aperture such as a circular shape or a rectangular shape, which should not limit this invention thereto. Alternatively, according to another preferred embodiment of this invention, the dimension of the apertures 58 may be the same. In this case, the packing density of these tiny apertures 58 is designed to achieve same goal of finely diffusing light. More specifically, the apertures 58 light above a lamp will arranged in a denser manner than those apertures distant from the lamp.

According to still another preferred embodiment of this invention, the diffusion film 56 is a metal film having thereon a plurality of dense through openings arranged in a matrix way. To achieve the goal of diffusing light, the distant between two adjacent through openings is controlled. Since the diffusion film 56 is made of metal, light use efficiency is significantly improved by virtue of multi-reflection of light between a lower reflection surface of the metallic diffusion film 56 and the underlying reflection plate. Furthermore, to facilitate heat transfer from the backlight unit to outside environment (i.e. air), a heat-dissipating piece 60, which is also made of high thermally conductive materials, such as aluminum, copper, magnesium, titanium, or silver, or polymer composite materials, is disposed at a periphery of the diffusion film 56. Heat generated by the lamps 14 firstly transfers to the diffusion film 56, then to the heat-dissipating piece 60 located at the periphery of the diffusion film 56, and then exchanges with surrounding cool air. According to the first preferred embodiment of this invention, the heat-dissipating piece 60 is made of aluminum or copper.

To create consistent surface temperatures cross the entire surface of the diffusion film 56 during an illumination operation, one can implement an experimental test and measure temperature at different sites on the diffusion film when lamps are turned on. At the peripheral edge of the diffusion film 56 near the area with higher temperature during an experimental illumination operation as described above, more than one heat-dissipating pieces may be added to increase the heat transfer rate near the high temperature area. This can avoid the distortion of overlying optic focusing film 22 due to uneven distribution of heat over the diffusion film 56. Further, the heat-dissipating piece 60 is foldable. In some cases, the heat-dissipating pieces 60, arranged at periphery of the diffusion film 56, are folded down to attached the outer walls of the housing 54, or embedded into the outer walls of the housing 54. Moreover, the heat-dissipating pieces 60 may be shaped into waved strips and folded down to lean against the outer walls of the housing 54 to further facilitate heat exchange.

Figure 5:
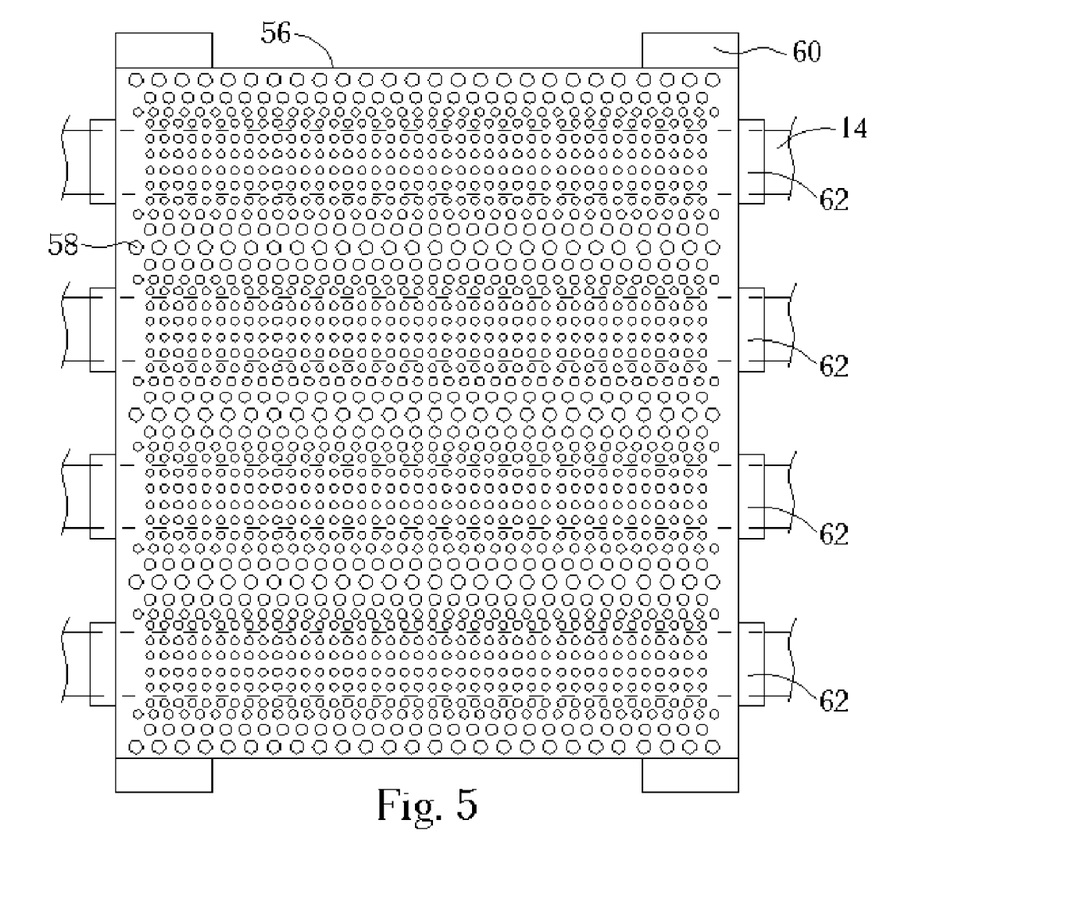
FIG. 5 is a top view of the diffusion film according to the present invention.
Figure 6:
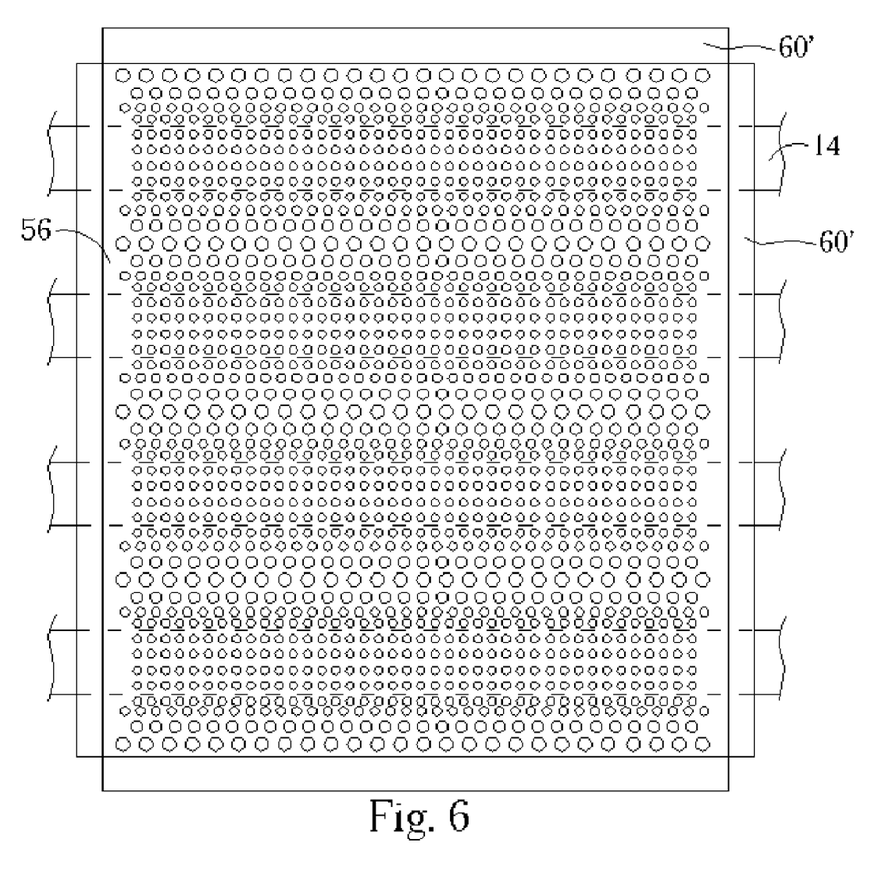
FIG. 6 is a top view of another diffusion film according to the present invention.

Please refer to FIG. 5. FIG. 5 is a top view of the diffusion film 56 according to the preferred embodiment of this invention. As shown, a plurality of tiny apertures 58 with various diameters are provided on the diffusion film 56. Multiple lamps 14 are laid underneath and are depicted in dash lines. As mentioned, to achieve a best light diffusion effect, the diameter of the apertures 58 right above the lamps 14 (hereinafter refer to as overlapping apertures) is smaller than the diameter of the apertures 58 next to these overlapping apertures, which are more distant from the lamps 14. It is noted that the apertures 58 are not drawn to scale and are enlarged for the sake of simplicity. The formation of the apertures 58 is accomplished by using a laser technique or metal photo-etching processes known in the art to form a desired shape of apertures in micron scale such as circular shape or rectangular shape, which should not limit this invention thereto. Light, which is generated by the lamps 14 and does not penetrate through the apertures 58 directly up to the overlying display panel, is multi-reflected between the diffusion film 56 and underlying reflection plate, thereby improving light use efficiency. The heat dissipating pieces 60 are arranged along the periphery of the diffusion film 56. Additional heat-dissipating pieces 62 are arranged over the lamps 14 to increase the heat transfer rate. Referring to FIG. 6, a top view of the diffusion film 56 according to another preferred embodiment of this invention is illustrated. As shown in FIG. 6, the heat-dissipating piece 60" may be a continuous strip along the periphery of the diffusion film 56.

Figure 7:
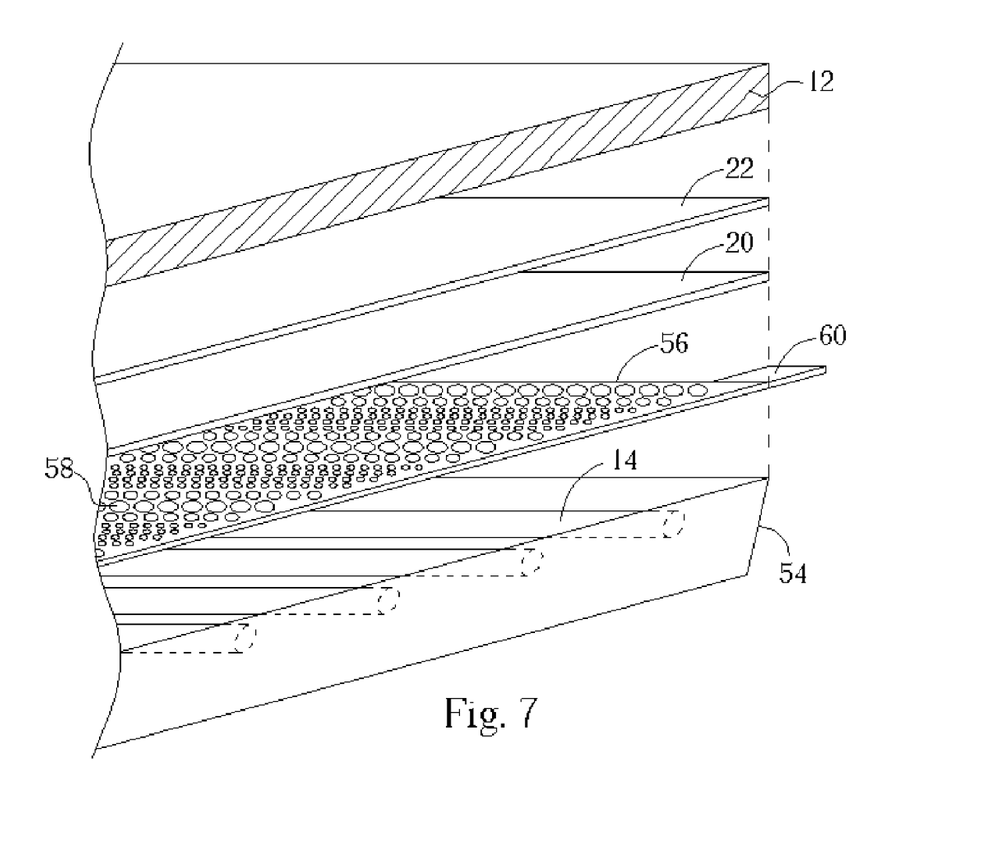
FIG. 7 is a schematic exploded diagram of another example of the present invention.

Please refer to FIG. 7. FIG. 7 is a schematic exploded diagram according to another preferred embodiment of this invention. The backlight unit is installed under a display panel 12. The backlight unit comprises a diffusion film 56, a reflection plate 18, and a plurality of lamps 14. The lamps 14 may be cold cathode fluorescent lamps (CCFL) arranged in a chamber 30 defined by the diffusion film 56 and the reflection plate 18. The reflection plate 18 may be made of metals such as aluminum, alloys, foamed PET film, or PC resins. The diffusion film 56, which has a thickness of less than 0.5 mm, is made of materials having high thermal conductivity, for example, metals or alloys such as aluminum, copper, magnesium, titanium, or silver, or polymer composite materials. The diffusion film 56 has a plurality of tiny apertures formed thereon. The packing density of these densely arranged tiny apertures and dimensions of each of these tiny apertures depend on the arrangement of the lamps 14 as described. Above the diffusion film 56 there are provided a diffusing sheet 20 and an optic focusing film 22 for enhancing backlighting. The diffusing sheet 20 (or protection diffusing sheet), which is made of PET or PC, has a higher light transmission ratio than that of the underlying diffusion plate 16, a lower haze, and a thickness of about 0.11 mm to 0.15 mm. At least one heat-dissipating piece 60, which is also made of high thermal conductivity materials, such as aluminum, copper, magnesium, titanium, or silver, or polymer composite materials, is disposed at a periphery of the diffusion film 56. Heat generated by the lamps 14 firstly transfers to the diffusion film 56, then to the heat-dissipating piece 60 located at the periphery of the diffusion film 56.

Figure 8:
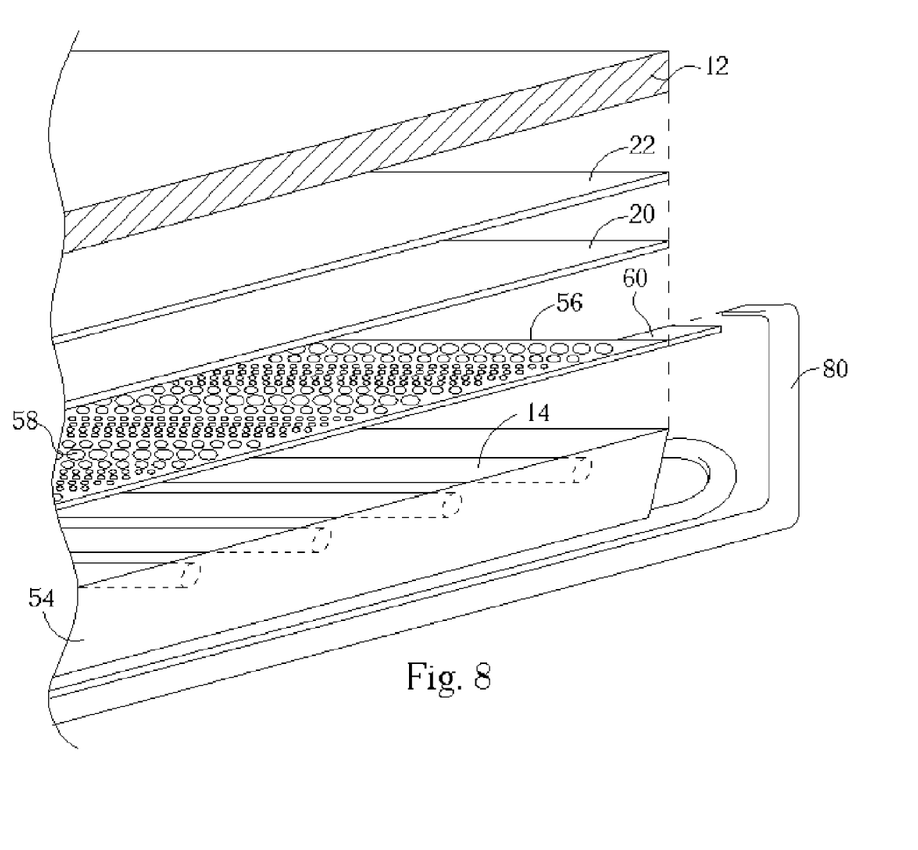
FIG. 8 is a schematic exploded diagram of another example of the present invention.

Please refer to FIG. 8. FIG. 8 is a schematic exploded diagram according to still another preferred embodiment of this invention. The backlight unit is installed under a display panel 12. The backlight unit comprises a diffusion film 56, a reflection plate 18, and a plurality of lamps 14. The lamps 14 may be cold cathode fluorescent lamps (CCFL) arranged in a chamber 30 defined by the diffusion film 56 and the reflection plate 18. The reflection plate 18 may be made of metals such as aluminum, alloys, foamed PET film, or PC resins. The diffusion film 56, which has a thickness of less than 0.5 mm, is made of materials having high thermal conductivity, for example, metals or alloys such as aluminum, copper, magnesium, titanium, or silver, or polymer composite materials. Likewise, the diffusion film 56 has a plurality of tiny apertures formed thereon. The packing density of these densely arranged tiny apertures and dimensions of each of these tiny apertures depend on the arrangement of the lamps 14 as described. Above the diffusion film 56 there are provided a diffusing sheet 20 and an optic focusing film 22 for enhancing backlighting. The diffusing sheet 20, which is made of PET or PC, has a higher light transmission ratio than that of the underlying diffusion plate 16, a lower haze, and a thickness of about 0.11 mm to 0.15 mm. At least one heat-dissipating piece 60, which is also made of high thermal conductivity materials, such as aluminum, copper, magnesium, titanium, or silver, or polymer composite materials, is disposed at a periphery of the diffusion film 56. The heat-dissipating piece 60 is combined with a heat exchanger device 80 such as a heat pipe. Heat generated by the lamps 14 firstly transfers to the diffusion film 56, then to the heat-dissipating piece 60 located at the periphery of the diffusion film 56, and then to the heat pipe, at there, heat is exchanged with surrounding cool air. The heat pipe 80 may be looped at a rear surface of the housing 54, or embedded into the rear surface of the housing 54. Moreover, the heat exchanger device 80 may be a metallic net.

In contrast to the prior art backlight unit, it is advantageous to use the present invention because the lifetime of CCFL lamps can be elongated due to the significant improvement of heat dissipation. In lieu of conventional thick PC/PMMA diffusion plate, a new idea of using a thin metallic diffusion film (below 0.5 mm) with a plurality of tiny apertures thereon is provided in this invention. Further, the diffusion film made of metal can reflect light and thus increase light use efficiency and brightness of the backlight unit.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A direct-type backlight unit for a flat panel liquid crystal display, comprising:
    a plurality of lamps installed within a housing;
    a reflection plate installed under the plurality of lamps in the housing; and
    a metal diffusion film with a plurality of apertures thereon installed above the plurality of lamps for diffusing light generated by the plurality of lamps and dissipating heat from the direct-type backlight unit.

2. The direct-type backlight unit of claim 1, wherein each of the plurality of lamps is a cold cathode fluorescent lamp (CCFL).

3. The direct-type backlight unit of claim 1, wherein the metal diffusion film has a thickness of less than 0.5 mm.

4. The direct-type backlight unit of claim 1, further comprising a diffusion sheet located on the metal diffusion film.

5. The direct-type backlight unit of claim 1, wherein at least one heat-dissipating piece is connected to a periphery of the metal diffusion film.

6. The direct-type backlight unit of claim 5, wherein the heat-dissipating piece is made of metal.

7. The direct-type backlight unit of claim 5, further comprising a heat exchanging means connected with the heat-dissipating piece.

8. The direct-type backlight unit of claim 7, wherein the heat exchanging means is a heat pipe.

9. The direct-type backlight unit of claim 1, wherein the apertures on the metal diffusion film have different diameters/dimensions.

10. The direct-type backlight unit of claim 9, wherein the diameter/dimension of the apertures directly above the lamps is smaller than the diameter/dimension of the apertures not directly above the lamps.

11. The direct-type backlight unit of claim 1, wherein the diameters/dimensions of the apertures are the same.

12. The direct-type backlight unit of claim 11, wherein the metal diffusion film has a highest aperture packing density at an area directly over the lamps.

13. The direct-type backlight unit of claim 1, wherein the apertures are circular or rectangular.

14. The direct-type backlight unit of claim 1, wherein the apertures are columns and rows of through slots arranged on the metal diffusion film.

15. A direct-type backlight unit for a flat panel liquid crystal display, comprising:
    a plurality of lamps installed within a housing;
    a reflection plate installed under the plurality of lamps in the housing;
    a diffusion film with a plurality of apertures thereon installed above the plurality of lamps for diffusing light generated by the plurality of lamps;
    a heat-dissipating piece directly connected to the diffusion film; and
    a heat exchanging means connected with the heat-dissipating piece.

16. The direct-type backlight unit of claim 15, wherein the diffusion film is made of metal and has a thickness of less than 0.5 mm.

17. The direct-type backlight unit of claim 15, further comprising a diffusion sheet located on the diffusion film.

18. The direct-type backlight unit of claim 15, wherein the heat-dissipating piece is made of metal.

19. The direct-type backlight unit of claim 15, wherein the heat exchanging means is a heat pipe.

20. The direct-type backlight unit of claim 15, wherein the diffusion film is made of metal.

* * * * *